United States Patent [19]

Hittmair et al.

[11] 3,957,683

[45] May 18, 1976

[54] PASTE-LIKE MIXTURES CONTAINING A CROSS-LINKING AGENT AND A CONDENSATION CATALYST

[75] Inventors: Paul Hittmair; Wolfgang Hechtl; Ernst Wohlfarth; Richard Schmidlkofer, all of Burghausen, Germany

[73] Assignee: Wacker-Chemie GmbH, Munich, Germany

[22] Filed: Mar. 18, 1974

[21] Appl. No.: 452,159

[30] Foreign Application Priority Data
Mar. 16, 1973 Germany................ 2313218

[52] U.S. Cl. ............... 252/428; 252/431 R; 252/431 C; 260/375 B
[51] Int. Cl.² ............ B01J 21/08; B01J 31/12; B01J 31/04
[58] Field of Search ............ 252/428, 431 R, 431 C

[56] References Cited
UNITED STATES PATENTS

| | | |
|---|---|---|
| 2,668,151 | 2/1954 | Pedlow et al. ............... 252/428 |
| 3,024,126 | 3/1962 | Brown............................ 252/428 X |
| 3,417,047 | 12/1968 | Golitz et al. .................. 252/428 X |
| 3,661,817 | 5/1972 | Hamilton et al. ............. 252/428 X |
| 3,666,830 | 5/1972 | Alekna.......................... 252/428 X |
| 3,684,793 | 8/1972 | Pepe et al. ................... 252/428 X |
| 3,689,454 | 9/1972 | Smith et al.................... 252/428 X |
| 3,691,128 | 9/1972 | Vincent......................... 252/428 X |
| 3,792,147 | 2/1974 | Wohlfarth et al............. 252/428 X |

FOREIGN PATENTS OR APPLICATIONS

1,669,940   8/1971   Germany ................ 252/428

*Primary Examiner*—Patrick P. Garvin

[57] ABSTRACT

The invention relates to paste-like mixtures that are used in the preparation of room temperature vulcanizable compositions comprising a cross-linking agent, a condensation catalyst and a hydrophobic silicon dioxide thickening agent which is solid at room temperature.

8 Claims, No Drawings

PASTE-LIKE MIXTURES CONTAINING A CROSS-LINKING AGENT AND A CONDENSATION CATALYST

This invention relates to silicone rubbers, particularly room temperature vulcanizable organopolysiloxane compositions and more particularly to paste-like mixtures which are used in the preparation of room temperature vulcanizable organopolysiloxane compositions.

Room temperature silicone rubbers fall into two groups; namely, (1) the two component systems wherein the basic polymer, cross-linking agent and condensation catalyst are mixed just prior to use and (2) the one component systems wherein the basic polymer and cross-linking agent are mixed and stored and curing occurs only upon exposure of the mixture to air. The paste-like mixtures of this invention constitute one component of these two component systems.

The two component systems sold heretofore required that the curing catalyst be packaged separately from the siloxane polymer. If the catalyst is packaged with the siloxane polymer, further polymerization of the polymer through condensation of the endblocking hydroxyl radicals will occur and the progressively higher polymer becomes elastomeric and useless after a few days of storage.

Furthermore, the reactivity of the cross-linking agent and catalyst often requires separate packaging, making it difficult to obtain the proper proportion of siloxane polymer, cross-linking agent and catalyst. The rate of vulcanization is, in general, dependent upon the proportions of ingredients present, hence the proper proportions are important. When cross-linking agents and/or catalyst are packaged entirely separate from the siloxane polymer, proper proportions and homogeneous distribution of catalyst throughout the polymer mixture is extremely difficult, if not impossible.

German Patent No. DT-AS 1,153,169 describes a two component system in which the cross-linking agent is mixed with a hydroxyl endblocked diorganopolysiloxane polymer and the catalyst is mixed with a triorganosilyl endblocked diorganosiloxane polymer. Each mixture can contain fillers, pigments, flavorings and other additives. However, this system has the disadvantage that the cross-linking capacity of material which contains the cross-linking agent decreases during storage, especially if the material is not used immediately or within a relatively short period of time.

German Patent No. DT-OS 1,669,940 discloses mixing a cross-linking agent and condensation catalyst with a thickening agent, such as calcium carbonate, and storing these separately from a mixture containing the organopolysiloxane and carbon black. However, the use of calcium carbonate as a thickening agent has one disadvantage; namely, it settles during storage.

It is therefore, an object of this invention to provide a two component room temperature vulcanizable composition having improved properties. Another object of this invention is to provide a composition in which the reactivity of the cross-linking agent is substantially constant even when stored for long periods of time. Still another object of this invention is to provide a two component system in the form of two stable paste-like components. A further object of this invention is to provide a two component system having improved stability over long periods of time. A still further object of this invention is to provide a paste-like mixture containing a thickening agent which is solid at room temperature which does not settle during storage.

The foregoing objects and others which will become apparent from the foregoing description are accomplished in accordance with this invention, generally speaking, by providing paste-like mixtures for preparing organopolysiloxane-based compositions which vulcanize at room temperature to form elastomers. The paste-like mixtures contain as the essential ingredients a cross-linking agent, a condensation catalyst and a very fine hydrophobic silicon dioxide which is solid at room temperature. These paste-like mixtures are then mixed with organopolysiloxanes which are capable of cross-linking to form room temperature vulcanizable silicone rubbers.

Hydrophobic silicon dioxide is generally known and its preparation is described in German Patent No. DT-OS 1,951,620 and U.S. Pat. No. 2,610,167 to Te Grotenhuis. Generally, it is formed by reacting very fine silicon dioxide with compounds that impart hydrophobic properties to the silicon dioxide. Examples of suitable compounds are organosilicon compounds, alcohols, long-chain fatty acids, long-chain fatty acid amides, organic isocyanates and carbodimides.

The silicon dioxide which is reacted with compounds that impart hydrophobic properties thereto has a surface area of at least 50 m²/g. and usually from 150 to 400 m²/g. Generally, it is designated as "very fine" or "highly dispersed" silicon dioxide. The surface area is measured by nitrogen absorption, according to methods which are generally identified as "BET" and which are described in ASTM Special Bulletin No. 51, 1941, pg. 95. Usually the silicon dioxide is produced pyrogenially, for example by burning, or by the hydrolysis of silicon tetrachloride at temperatures above 800°C. Additional examples of very fine silicon dioxide are the silicic acid hydrogels which have been dehydrated while preserving their structure, i.e., the so-called aerogels, the xerogels, and precipitated silicon dioxide having a surface area of at least 50 m²/g.

Any compounds which impart hydrophobic properties to silicon dioxide may be employed in the preparation of the very fine hydrophobic silicon dioxide used in this invention.

Examples of suitable compounds which impart hydrophobic properties to the silicon dioxide are organosilicon compounds, especially those corresponding to the general formla

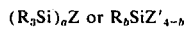

where R is the same or different and represent monovalent hydrocarbon radicals, and halogenated monovalent hydrocarbon radicals, Z and Z' represent a halogen, hydrogen or a radical corresponding to the formula —OH, —OR', —NR'X, —ONR'$_2$, —SR' and OOCR'. Other radicals represented by Z are —O—, —N(X)— and —S—. The radical R' may represent a monovalent hydrocarbon radical or a substituted monovalent hydrocarbon radical, such as alkyl radicals having from 1 to 4 carbon atoms, X represents hydrogen or is the same as R', and $a$ and $b$ represent 1 or 2. The organosilicon compounds also include octamethylcyclotetrasiloxane and/or dimethylpolysiloxanes, which have terminal Si-bonded hydroxyl gorups, with from 2 to 12 siloxane units per molecule.

Examples of monovalent hydrocarbon radicals having up to 18 carbon atoms are methyl, ethyl, n-propyl, butyl, octyl, decyl, octadecyl, phenyl and vinyl radicals.

Examples of substituted hydrocarbon radicals represented by R are halogenated hydrocarbon radicals, such as 3,3,3-trifluoropropyl radicals.

Suitable examples of hydrocarbon radicals represented by R' are methyl, ethyl, propyl and butyl radicals. Examples of substituted hydrocarbon radicals represented by R' is an aminoethyl radical.

Examples of suitable organosilicon compounds corresponding to the above formulae are hexamethyldisilazane, trimethylethoxysilane, trimethylsilane, trimethylchlorosilane; triorganosilylmercaptans such as trimethylsilylmercaptan; triorganosilyloxyacylates, such as vinyldimethylacetoxysilane; triorganosilylamines such as trimethylsilylisopropylamine, trimethylsilylethylamine, dimethylphenylsilylpropylamine, and vinyldimethylsilylbutylamine; triorganosilylaminoxy compounds such as diethylaminoxytrimethylsilane and diethylaminoxydimethylphenylsilane. Other organosilicon compounds are hexamethyldisiloxane, 1,3-divinyltetramethyldisiloxane, 1,3-diphenyltetramethyldisiloxane, 1,3-diphenyltetramethyldisilazane, dimethyldichlorosilane, dimethyldiethoxysilane, dimethyldimethoxysilane, diphenyldiethoxysilane, vinylmethyldimethoxysilane and methyltriethoxysilane.

Mixtures of different compounds that impart hydrophobic properties to silicon dioxide may be reacted with very fine silicon dioxide.

The amount of organosilicon compound used in the reaction with the very fine silicon dioxide is preferably from 3 to 26 percent by weight and more preferably from 4 to 8 percent by weight based on the weight of the silicon dioxide.

Very fine hydrophobic silicon dioxide is commercially available under the name "Aerosil (Registered Trademark) R 972" from Deutsche Gold and Silberscheideanstalt, formerly Roessler, Frankfurt a.M., Germany. This is prepared by treating silicon dioxide with dimethyldichlorosilane to form a hydrophobic silicon dioxide having a BET value of 120 ± 30 m²/g and an analytical hydrocarbon content of 1.1 ± 0.2 percent by weight (cf. e.g. "Chemiker-Zeitung/Chemische Apparatur" 89, 1965, p. 437). A silicon dioxide which is made hydrophobic with trimethylethoxysilane and which is produced pyrogenically in the gaseous phase, and having a BET-area of 150 ± 20 m²/g and a bulk weight of about 50 g/l or about 300 g/l, is available under the name "HDK H 20" or "HDK H 2000" from Elektroschmelzwerk Kempten GmbH, Munich, Germany. Also a silicon dioxide which is made hydrophobic with hexamethyldisilazane and which is produced pyrogenically in the gaseous phase with a BET-area of about 225 m²/g. is available under the name "Silanox" (Registered Trademark) from Cabot Corporation, Boston, Mass., USA.

These commercial products consist of very fine silicon dioxide which has been treated with methylchlorosilanes or trimethylethoxysilane or hexamethyldisilazane to impart hydrophobic properties thereto. Surprisingly it was found that a very fine silicon dioxide which has been rendered hydrophobic with an organoalkoxysilane or hexaorganodisilazane yields a homogeneous paste merely be stirring with the other paste ingredients, whereas a mixture of very fine silicon dioxide which has been rendered hydrophobic by treating with organochlorosilanes will yield a homogeneous paste when combined with other paste ingredients only under the action of a three-roll mill. It was also found that during storage of the paste-like mixtures that the very fine silicon dioxide which has been treated with organochlorosilane to impart hydrophobic properties thereto, tends to form agglomerations or small lumps in localized areas in the paste-like material. These paste-like mixtures containing small lumps are more difficult to mix with the organopolysiloxane polymers. On the other hand, no lumps are observed during storage of paste-like mixtures which contain very fine silicon dioxide which has been treated with organoalkoxysilanes or hexaorganodisilazanes as thickening agents to impart hydrophobic properties thereto.

Thus, it is preferred that the hydrophobic silicon dioxide be treated with organoalkoxysilanes, i.e. silanes corresponding to the general formula $R_cSi(OR')_{4-c}$, where R and R' are the same as described above and $c$ is 1, 2 or 3, preferably 3; and/or hexaorganodisilazanes, i.e., compounds corresponding to the general formula $R_3SiN(X)SiR_3$, where R and X are the same as above.

All cross-linking agents which have been used heretofore in the preparation of room temperature vulcanizable organopolysiloxane-based polymers can also be used as cross-linking agents in this invention. Examples of suitable cross-linking agents are the silanes corresponding to the general formula

$$R_{4-d}Si(OR'')_d$$

where R is the same as above, R'' is the same as R' or a hydrocarbon radical having from 1 to 8 carbon atoms which is interrupted by an oxygen atom, and $d$ is 3 or 4. Examples of other cross-linking agents are the di-, tri-, tetra- or polysiloxanes which contain at least 3 oxygen to silicon-bonded R'' groups and/or Si-bonded hydrogen atoms per molecules, whereby the silicon valences that are not satisfied by R'' groups or by hydrogen atoms are satisfied by siloxane oxygen atoms and/or R-groups. Examples of suitable crosslinking agents are orthosilicates $(CH_3O)_4Si$, $(C_2H_5O)_4Si$ and $(C_4H_9O)_4Si$; polysilicates such as hexaethoxydisiloxane, hexaisopropoxydisiloxane, ethylpolysilicates, propylpolysilicates, polyethylsilicate having an $SiO_2$ content of about 40 percent by weight; alkyltrialkoxysilanes such as methyltriethoxysilane, ethyltrimethoxysilane; aryltrialkoxysilanes such as phenyltributoxysilane; ortho esters of silicic acid such as silicic acid ortho esters of glycols; organohydrogensiloxanes having polymers of the unit formula RHSiO where R is the same as above and has a viscosity ranging from a very thin fluid (e.g. 5 cSt at 25°C.) to thick fluids (e.g. 50,000 cSt at 25°C.). These organohydrogensiloxanes can be end-blocked with hydrogen atoms, hydroxyl radicals or triorganosilyl groups; however, they must contain an average of at least 2 silicon bonded hydrogen atoms per molecule. Preferred are the methylhydrogensiloxane polymers of the unit formula $(CH_3)HSiO$.

Suitable examples of hydrocarbon radicals represented by R'' which are interrupted by an oxygen atom are those corresponding to the formulae $CH_3OCH_2CH_2-$ and $CH_3CH_2OCH_2CH_2-$ and the like.

All condensation catalysts which have been used heretofore in the preparation of room temperature vulcanizable organopolysiloxane-based polymers can also be used as condensation catalysts in this invention. Examples of suitable condensation catalysts are metallic carboxylic acid salts or organometallic carboxylic acid salts of metals belonging to the electromotive series from lead to manganese, such as dibutyl tin dilaurate, dibutyl tin diacetate, tin-II-octoate, a dibutyl tin diacylate in which the acylate groups are derived from a mixture of carboxylic acids having from 9 to 11 carbon atoms per molecule, in which acids the carboxyl group is bound to a tertiary carbon atom; distannoxanes, such as diacetoxytetrabutyldistannoxane and dioleyloxytetramethyldistannoxane; dibutyl tin dioctoate, ferric octoate, lead octoate, lead laurate and cobalt naphthenate; titanium esters such as tetrabutyltitanate; amines such as n-hexylamine; amine salts such as n-hexylamine hydrochloride and n-butylamine acetate.

The paste-like mixtures of this invention contain 1 part by weight of condensation catalyst for from 1 to 10 parts by weight, preferably 1 to 5 parts by weight, of cross-linking agent.

These paste-like mixtures preferably contain from 1 to 10 parts by weight and more preferably from 3 to 7 parts by weight of cross-linking agent and condensation catalyst for each part by weight of very fine hydrophobic silicon dioxide.

Since the paste-like mixtures of this invention constitute one component of the two component system, they contain a cross-linking agent and condensation catalyst as the only materials which are able to condense or promote condensation, and they contain a very fine hydrophobic silicon dioxide as the thickening agent. Of course, they may also contain other additives, provided these substances are inert with respect to the aforementioned ingredients in the paste-like mixtures and are suitable as components of organopolysiloxane elastomers. Examples of such additives are softeners such as paraffin oils, petrolatum, which is available commercially, for example under the name "Vaseline" (Registered Trademark), low molecular weight polyethylene and dimethylpolysiloxanes which are fluid at room temperature and are endblocked by trimethylsiloxy groups. These substances not only operate as softeners in the elastomers which are prepared from the paste-like mixtures of the invention, but they also enhance the pliability of the pastes. They may be employed in quantities of up to and preferably 80 percent by weight of the total weight of the paste-like mixture. Examples of other inert additives which may be employed are soluble dyes and perfumes as well as water-combining agents such as gypsum.

These paste-like mixtures are mixed with organopolysiloxanes which are capable of cross-linking at room temperature to form elastomers. Of course, these organopolysiloxanes are the same organopolysiloxanes which have been used heretofore in the two component systems containing cross-linking agents and condensation catalysts. The organopolysiloxanes may be represented by the general formula

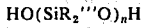

in which $R'''$ is the same or different and represents a monovalent hydrocarbon radical, a substituted hydrocarbon radical and/or polymeric hydrocarbon radicals, and $n$ represents a number having a value of at least 10.

The siloxane chain of the above formula may also include other siloxane units in addition to the diorganosiloxane units ($SiR_2'''O$). Examples of such other siloxane units which usually exist only as impurities are those corresponding to the formulae $R'''SiO_{3/2}$, $R_3'''SiO_{1/2}$ and $SiO_{4/2}$, where $R'''$ is the same as above. However, the quantity of such other siloxane units should not exceed about 10 mol percent. Still other siloxane units such as those corresponding to the formula $-OSiR_2'''R^oSiR_2'''O-$ where $R'''$ is the same as above and $R^o$ represents a bivalent hydrocarbon radical, e.g., phenyl radical, may also be present.

Examples of hydrocarbon radicals represented by $R'''$ are alkyl radicals such as methyl, ethyl, propyl, butyl, hexyl and octadecyl radicals; alkenyl radicals such as vinyl, allyl, ethyallyl and butadienyl radicals; aryl radicals such as the phenyl radical; alkaryl radicals such as the tolyl radicals; and aralkyl radicals such as the beta-phenylethyl radical.

Examples of substituted hydrocarbon radicals represented by $R'''$ are halogenated hydrocarbon radicals such as 3,3,3-trifluoropropyl radical, chlorophenyl and bromotolyl radicals as well as cyanoalkyl radicals such as the beta-cyanoethyl radical.

Polymeric (also designated as "modifying") substituted and unsubstituted hydrocarbon radicals represented by $R'''$ are those composed of recurring units which are derived from compounds that are polymerizable through additive polymerization, such as styrene, vinyl acetate, acrylic acid, methacrylic acid, acrylic acid esters, methacrylic acid esters and/or acrylonitrile.

Because of their availability, it is preferred that a majority of the $R'''$ radicals be methyl radicals and the remaining $R'''$ radicals be vinyl and/or phenyl radicals.

The viscosity of the cross-linking organopolysiloxanes generally amounts to from 100 to 500,000 cSt at 25°C.

Generally, before the cross-linking organopolysiloxanes are mixed with the paste-like materials of this invention, they are mixed with other additives which are usually employed with conventional room temperature vulcanizable organopolysiloxanes. These additives are usually inert, at least at room temperature, with respect to these organopolysiloxane-based polymers. Examples of such additives are reinforcing and/or non-reinforcing fillers, pigments, soluble dyes, perfumes, corrosion inhibitors, oxidation inhibitors, heat stabilizers, peroxides, organopolysiloxane resins and pure organic resins such as polyvinylchloride powder; and softeners such as dimethylpolysiloxane fluids which are endblocked with trimethylsiloxy groups.

In contrast to German Patent No. DT-OS 1,669,940, there is no limitation to the particular kind of carbon black which can be used as a filler, in the composition of this invention. Preferred examples of reinforcing fillers which can be used in these organopolysiloxanes are a silicon dioxide which is produced pyrogenically in the gaseous phase, silicon dioxide aerogels and a precipitated silicon dioxide having a surface area of at least 50 m²/g.

Examples of nonreinforcing fillers, i.e., fillers having a surface area of less than 50 m²/g are quartz powder, diatomaceous earth, calcium silicate, zirconium silicate and calcium carbonate.

The fillers can be employed in amounts of from 5 to 500 parts filler, preferably from 10 to 400 parts of filler per 100 parts by weight os siloxane polymer.

The paste-like mixtures of this invention are mixed with the cross-linking organopolysiloxanes in such amounts that the finished mixture has the same ratio of cross-linking organopolysiloxanes to cross-linking agent and condensation catalyst as is used in the conventional room temperature vulcanizable organopolysiloxane compositions. Usually the amount of cross-linking agent ranges from about 0.1 to about 15 percent by weight and the amount of condensation catalyst ranges from about 0.01 to about 10 percent by weight based on the total weight of the organopolysiloxane composition. The amount of paste-like mixture for a given amount of cross-linking organopolysiloxane can, if the paste is marketed in a tube, for example, be easily measured out by using a measuring device, which is usually added to the package, to compare the length of the strand of paste pressed from the tube.

The paste-like mixture containing the cross-linking agent, condensation catalyst and hydrophobic silicon dioxide can be prepared on a mill, in a mixer or by any other desired means including manual mixing.

The cross-linking organopolysiloxane polymer can be combined with various fillers and other additives and mixed on a mill, in a mixer or by any other desired means including manual mixing.

The use of paste-like mixtures, one containing the cross-linking agent, condensation catalyst and hydrophobic silicon dioxide and the other containing hydroxyl endblocked diorganopolysiloxane polymers permits the preparation, storage, commercial sale and use of the room temperature vulcanizable (RTV) silicone rubber in the form of two stable paste-like components. It is now feasible to prepare two separate mixtures of the RTV silicone rubber stocks and pack the mixture in two cartons, tubes or other container. This system of packaging the RTV silicone rubber stocks is particularly advantageous when the materials are to be used for dental impressions, seals, as joint fillers and for other commercial uses.

In the following examples, all parts are by weight unless otherwise specified.

EXAMPLE 1

In a planetary mixer, 30 parts of petrolatum are first mixed with 70 parts of a mixture containing equal parts tetra(beta-methoxy-ethoxy)-silane [$(CH_3OCH_2CH_2O)_4Si$] and dibutyl tin dilaurate and then are mixed with 13 parts of a commercial silicon dioxide which has been pyrogenically produced in the gaseous phase and has been treated with hexamethyldisilazane to render the silicone dioxide hydrophobic. A soft, homogeneous paste is obtained.

EXAMPLE 2

The procedure of Example 1 is repeated except that 13 parts of a commercially produced pyrogenic silicon dioxide which has been made hydrophobic with trimethylethoxysilane is substituted for the hydrophobic silicon dioxide treated with hexamethyldisilazane. A soft, homogeneous paste is obtained.

EXAMPLE 3

In a planetary mixer, 15 parts of petrolatum are first mixed with 70 parts of a mixture containing equal parts tetra(beta-methoxyethoxy)-silane and dibutyl tin dilaurate and then mixed with 15 parts of a commercially produced pyrogenic silicon dioxide which has been made hydrophobic with dimethyldichlorosilane. The resulting mixture is homogenized with a three-roll mill.

EXAMPLE 4

In a planetary mixer, 44 parts of a mixture containing equal parts tetra-(beta-methoxyethoxy)-silane and dibutyl tin dilaurate are mixed with 10 parts of a commercially produced pyrogenic silicon dioxide which has been made hydrophobic with hexamethyldisilazane. A homogeneous paste is obtained.

EXAMPLE 5

The procedure of Example 2 is repeated except that 70 parts of a mixture containing 52.5 parts of hexaethoxydisiloxane and 17.5 parts dibutyl tin are substituted for the mixture containing equal parts of tetra(-beta-methoxyethoxy)-silane and dibutyl tin dilaurate. A homogeneous paste is obtained.

EXAMPLE 6

In a planetary mixer, 56 parts of petrolatum are first mixed with 38 parts of a mixture containing 28.5 parts hexaethoxydisiloxane and 9.5 parts dibutyl tin dilaurate, and thereafter mixed with 6 parts of a commercially produced pyrogenic silicon dioxide which has been made hydrophobic with dimethyldichlorosilane. The resulting mixture is homogenized with a three-roll mill.

Although specific examples of the invention have been described herein, it is not intended to limit the invention solely thereto but to include all the variations and modifications falling within the spirit and scope of the appended claims.

What is claimed is:

1. An improved paste-like composition which is to be mixed with an organopolysiloxane composition to form a room temperature curable composition, said paste-like composition consisting essentially of a mixture of a cross-linking agent and a condensation catalyst capable of curing the organopolysiloxane composition said condensation catalyst being present in an amount of 1 part by weight for each 1 to 10 parts by weight of the cross-linking agent, the improvement which comprises adding to the mixture a hydrophobic silicon dioxide thickening agent which is a solid at room temperature and has a surface area of at least 50m$^2$/g, said hydrophobic silicon dioxide is present in an amount of one part by weight for each 1 to 10 parts by weight based on the total weight of the mixture containing the cross-linking agent and condensation catalyst.

2. The improved paste-like composition of claim 1 wherein the silicon dioxide is reacted with a compound selected from the group consisting of $(R_3Si)_aZ$ and $R_bSiZ'_{4-b}$ to impart hydrophobic properties thereto, wherein R is selected from the group consisting of monovalent hydrocarbon radicals and halogenated monovalent hydrocarbon radicals having up to 18 carbon atoms, Z is selected from the group consisting of halogen, hydrogen, —OH, —OR', —NR'X, —ONR'$_2$, —SR', —OOCR', —O—, —N(X)— and —S—, Z' is selected from the group consisting of halogen, hydrogen, —OH, —OR', —NR'X, —ONR'$_2$, —SR', and —OOCR', R' is an alkyl radical having from 1 to 4 carbon atoms, X is selected from the group consisting of hydrogen and R' and a and b are each equal to 1 or 2.

3. The improved paste-like composition of claim 1 wherein the silicon dioxide is reacted with trimethylethoxysilane to impart hydrophobic properties thereto.

4. The improved paste-like composition of claim 1 wherein the silicon dioxide is reacted with a silane of the formula $R_cSi(OR')_{4-c}$ to impart hydrophobic properties thereto, wherein R is selected from the group consisting of monovalent hydrocarbon radicals and halogenated monovalent hydrocarbon radicals having up to 18 carbon atoms, R' is an alkyl radical having from 1 to 4 carbon atoms and c is a number of 1 to 3.

5. The improved paste-like composition of claim 1 wherein the silicon dioxide is reacted with a silane of the formula $R_3SiN(X)SiR_3$ where R is selected from the group consisting of monovalent hydrocarbon radicals and halogenated monovalent hydrocarbon radicals having up to 18 carbon atoms, X is selected from the group consisting of hydrogen and R', where R' is an alkyl radical having from 1 to 4 carbon atoms.

6. The improved paste-like composition of claim 5 wherein the silane is hexamethyldisilazane.

7. The improved paste-like composition of claim 1 wherein the silicon dioxide is reacted with hexamethyldisiloxane to impart hydrophobic properties thereto.

8. The improved paste-like composition of claim 1 wherein the silicon dioxide is reacted with a dimethylpolysiloxane having terminal Si-bonded hydroxyl groups and from 2 to 12 siloxane units per molecule to impart hydrophobic properties thereto.

* * * * *